Patented June 19, 1945

2,378,378

UNITED STATES PATENT OFFICE 2,378,378

AMYLACEOUS ADHESIVE COMPOSITION

Hans F. Bauer, Chicago, Ill., assignor, by mesne assignments, to Stein, Hall & Co., Inc., a corporation of New York No Drawing. Application September 20, 1940,
Serial No. 357,553

17 Claims. (Cl. 106—205)

This invention relates to adhesive compositions, more particularly amylaceous adhesive compositions, and a new and improved method for the production thereof.

One of the objects of the invention is to provide new and improved amylaceous compositions made from an amylaceous substance or substances and a urea.

Another object of the invention is to provide an adhesive composition of the character described containing a stabilizing agent.

Still another object of the invention is to provide an adhesive composition of the character described in which the stabilizing agent also serves to reduce the tendency of dried films of the adhesive to whiten or the tendency of urea in said films to crystalize.

Another object of the invention is to produce new and improved remoistening amylaceous adhesives. Other objects will appear hereinafter.

These objects are accomplished in accordance with the present invention by the preparation of adhesive compositions containing an amylaceous substance or substances as the predominant adhesive film-forming component, a water soluble urea, and a stabilizing agent comprising a normally solid acid. It has been found that urea in amylaceous adhesive compositions tends to decompose slightly, thereby liberating ammonia fumes. In many instances the decomposition is so small as to be unobjectionable, but in other instances it is desirable that the adhesive composition be sufficiently stable so that there is no noticeable evidence of the decomposition. A normally solid acid such as critic acid, tartaric acid, malic acid, boric acid and the like, when added to an amylaceous composition containing urea in accordance with this invention, serves to act as a stabilizing agent to prevent the liberation of any decomposition products. At the same time it has been found that such normally solid acids are compatible with the other components of the adhesive composition. One of the advantages of employing a normally solid acid of the type just mentioned is that the resultant adhesive compositions are especially suitable for use as remoistening adhesives. The term remoistening adhesive is applied to a type of adhesive which is first dried to form an adhesive coating or film and which on being moistened will develop tack or adhesiveness.

Another feature of the present invention is based upon the discovery that certain normally solid acids, more particularly water soluble, normally solid, slightly hygroscopic, normally crystalline acids, when employed in sufficient amount, serve to reduce the whitening and pattern effect sometimes imparted to amylaceous compositions by the pressence of urea, and to clarify and impart gloss to dried films formed from such compositions. The invention, therefore, contemplates the utilization of normally solid acids in small amounts or in minor proportions for two purposes; namely, (1) to absorb any ammonia fumes due to the decomposition of urea, and (2) to inhibit crystallization or reduce the whitening or pattern effect in the adhesive composition. For the first purpose the quantities of the acid employed may be somewhat smaller than the quantities employed for the second purpose. Thus, the stabilization of the composition may be effected by using very small amounts of acid, in the neighborhood of about 2% or less. To inhibit crystallization somewhat larger amounts are normally required, preferably about 10% to 20% by weight of the total solids in the composition, although in some instances as low as 5% may be employed.

The normally solid acid employed as a stabilizing agent or as a crystallization inhibitor may be incorporated into the adhesive as a part of the dry base, consisting, for example, of an amylaceous substance, urea and the normally solid acid, with or without auxiliary substances, or it may be added to the adhesive in the liquid state. That is to say, the amylaceous substance and the urea, with or without auxiliary materials, may be dispersed in water, with or without heating, if necessary or desirable, and the normally solid acid may be added to the dispersion or to the liquid.

The amount of urea present in the adhesive composition may vary within relatively wide limits, depending upon the particular type of amylaceous material and upon the results desired. Thus, with amylaceous substances derived by the conversion or modification of starch, as, for example, dextrins, starch gums and the like, the amount of urea required may be less than with undegenerated starches. Ordinarily a minor proportion of urea is employed, based on the total solids in the adhesive composition, and the amount employed is normally in excess of 5% of the total solids. With starches and the starchier types of starch degeneration products it is usually desirable to use in excess of about 20% to 25% of urea. Hence, the amount of urea may vary all the way from about 5% to about 50%, depending upon the particular type of adhesive which is being prepared. If relatively large amounts of urea are employed the urea will serve to disperse the amylaceous material in limited quantities of water without heating, although even in this case heating may sometimes be desirable in order to accelerate the dispersion, or for other reasons. The use of a normally solid acid sufficient to stabilize the composition is desirable at all times, and the use of crystallization inhibiting quantities of the stabilizing ingredient becomes more important when the larger amounts of urea are employed.

The invention will be illustrated, but is not limited, by the following examples in which the quantities are stated in parts by weight unless otherwise indicated:

Example I

The following compositions were prepared by mixing together the ingredients shown in the various columns listed below:

|   | Hercules starch | Dextrine [1] | Urea | Ammonium chloride | Citric acid | Water | Characteristics of product: fluidity |
|---|---|---|---|---|---|---|---|
| 1 | 10 | 80 | 34 | 19 | 1 | 60 | Flows freely. |
| 2 | 10 | 80 | 34 | 10 | 0.5 | 60 | Flows. |
| 3 | 10 | 80 | 34 | 20 | 0 | 60 | Flows freely. |
| 4 | 20 | 80 | 50 | 19 | 1 | 60 | Flows, spreads well. |
| 5 | 20 | 80 | 24 | 19 | 1 | 60 | Does not flow. |
| 6 | 20 | 80 | 34 | 19 | 1 | 70 | Flows. |

[1] A white corn dextrin product which is about 25% to 30% water soluble.

These compositions were prepared by mixing together the ingredients at room temperature for about 10 to 15 minutes until a homogeneous gelatinous mass was obtained, and then allowing them to stand overnight. Strips of standard bond paper made from 100% rag were sealed together with each of the compositions and mixed in an oven at a temperature of 210° F. for 96 hours. These strips showed a very firm bond.

Example II

The following compositions were prepared by mixing together the ingredients shown in the various columns listed below:

|   | Hercules starch | White tapioca dextrin [1] | Urea | Ammonium chloride | Citric acid | Water | Characteristics of product: fluidity |
|---|---|---|---|---|---|---|---|
| 1 | 10 | 80 | 34 | 19 | 1 | 60 | Thin. |
| 2 | 20 | 80 | 34 | 19 | 1 | 60 | Do. |
| 3 | 10 | 80 | 34 | 20 | 0 | 60 | Flows very freely. |
| 4 | 20 | 80 | 50 | 19 | 1 | 60 | Flows. |
| 5 | 20 | 80 | 34 | 19 | 0 | 60 | Do. |
| 6 | 20 | 80 | 34 | 19 | 1 | 50 | Do. |
| 7 | 40 | 80 | 34 | 19 | 1 | 60 | Flows, good body. |
| 8 | 50 | 80 | 34 | 19 | 1 | 60 | Flows. |

[1] 35.1% water soluble.

These compositions were prepared according to the procedure of Example I. Strips of standard bond paper sealed with this series of compositions had good bond.

Example III

The following compositions were prepared by mixing together the ingredients shown in the various columns listed below:

|   | Hercules starch | White tapioca dextrin [1] | Urea | Corn sugar | Water | Citric acid | Characteristics of product: fluidity |
|---|---|---|---|---|---|---|---|
| 1 | 50 | 80 | 50 | 20 | 60 | 0 | Does not flow. |
| 2 | 50 | 80 | 50 | 10 | 60 | 0 | Flows. |
| 3 | 50 | 80 | 50 | 20 | 60 | 2 | Flows easily. |
| 4 | 50 | 80 | 50 | 20 | 60 | 1 | Do. |
| 5 | 50 | 80 | 34 | 20 | 60 | 1 | Does not flow. |
| 6 | 50 | 80 | 34 | 10 | 60 | 1 | Do. |

[1] 35.1% water soluble.

These compositions were prepared by the procedure of Example I. Films dried on glass did not crystallize and exhibited a slight tendency to be hygroscopic. Strips of standard bond paper sealed with compositions of this series and dried in a steam oven for 96 hours had good bond. Films of the compositions made on bond paper and dried for 24 hours had a fair gloss. All of these films are adhesive when remoistened.

Example IV

A composition was prepared by mixing together 62.5 parts of a white corn dextrin, 12% to 15% soluble in water, 25 parts of urea, 12.5 parts of sodium acetate, 0.25 part of citric acid, and 32 parts of water. This mixture was heated to a temperature of 175° F. and allowed to cool normally. The resultant product was found to be useful as a seam gum for sealing seams of bond envelopes. The particular white corn dextrin employed in this example is made by Stein, Hall Manufacturing Company under the name of Flexo.

Example V

A composition was prepared in a manner similar to that described in Example IV, except that 62.5 parts of 25% water soluble dextrin (Stein, Hall WC') were substituted for the 62.5 parts of white corn dextrin. Good results were obtained with the resultant composition when used as a seam gum.

*Example VI*

The following compositions were prepared by mixing the ingredients together as shown in the various columns listed below:

|   | Corn dextrin 25% soluble | Urea | Sodium acetate | Citric acid | Water |
|---|---|---|---|---|---|
| 1 | 71.5 | 28.5 |   |   | 35.7 |
| 2 | 63 | 32 | 5 | 0.25 | 30 |
| 3 | 70 | 24 | 6 |   | 30 |

These compositions were all prepared by mixing the ingredients at room temperature until a homogeneous gelatinous mass was obtained and then allowing them to stand overnight. They produced good films on various types of paper including bond paper and were found to be useful as tacking or similar gums for bond envelopes.

*Example VII*

An amylaceous adhesive composition was prepared by mixing together the following ingredients: 54.5% of a dextrin known as Stein, Hall XO, which is about 7.0% to 7.5% soluble and is derived from corn; 15% of a dextrinized wheat flour known as Stein, Hall 3½ W, which is about 15% to 20% soluble; 20 parts of urea; 10 parts of cane sugar; and ½ part of boric acid. The dry base composition was then mixed with water in proportions of 100 parts of dry base to 75 parts of water. The mixture was heated to 185° F. and then 1 part of phosphoric acid was added. The product is an excellent adhesive.

*Example VIII*

A composition was prepared by mixing together 50 parts of tapioca starch; 40 parts of urea; 65 parts of water; and 2 parts of citric acid. The mixture was stirred at ordinary temperatures around 75° F. and allowed to stand overnight. A strong adhesive was thereby obtained.

*Example IX*

A composition was prepared by mixing together 50 parts of tapioca starch; 30 parts of urea; 50 parts of water; and 10 parts of citric acid. The mixture was allowed to stand overnight at ordinary temperatures and an adhesive of strong bonding power was obtained. Films of this adhesive were spread on glass, paper and other plane surfaced objects. It was noted that these films did not exhibit urea crystallization or whitening when allowed to dry and stand over a substantial period of time.

In Examples VIII and IX corn starch may be substituted for the tapioca starch.

It will be apparent that modifications may be made in the proportions of the various compositions and in the use of auxiliary agents in preparing them. The dextrins may be such as are derived from starches by the usual methods of conversion, for example, hydrolysis, oxidation, heat or enzymatic action. Examples of suitable dextrins are those derived from wheat, rye, barley, corn, oat, rice, maize and potato starches, and sago and cassava flours. The solubility or dispersibility of the dextrins in water at ordinary temperatures and pressures may vary within relatively wide limits but usually will be in excess of about 10% and preferably more than about 50%. According to one of the preferred embodiments of the invention, compositions are prepared in which the solubility of the dextrin is within the range of 85% to 100%. These compositions are especially useful as seal gums, for instance, in making seals for the flaps of paper envelopes where the composition is dried on the envelope in the form of a film which must be flexible so as not to check or crack and must have adhesive properties when moistened in order that the envelope may be sealed. In general, the preferred compositions contain a major proportion of a dextrin or mixture of dextrins. Where the composition contains starch, more water and more urea are normally required.

While the best results have been obtained in the use of urea per se, it will be understood that other ureas and particularly water soluble ureas having a similar action may be employed to replace urea wholly or in part. Hence, the expression "a urea" is herein employed to cover substituted ureas, e. g., monomethylurea, monoethylurea, symmetrical dimethylurea and higher homologues, as well as analogues, e. g., thiourea.

The proportion of urea is subject to variation depending largely upon the type of amylaceous substance. It may also vary with the quantity of water. With dextrin compositions, less urea is required than with starch compositions and with low soluble dextrins more urea is required than with highly soluble dextrins, the urea serving in this case to increase the solubility of the low soluble dextrins as well as to produce a more flexible film. If the composition contains a starch in substantial amounts, say 10% or more based upon the total weight of the amylaceous material, it is preferable to use a relatively large amount of urea, for instance, 25% or more of urea based upon the total weight of starch or starch derivative and urea. The lower limit of the amount of urea in treating amylaceous substances containing starch is that amount which will produce a gelatinous product at ordinary temperatures, as distinguished from a hard solid which cannot be readily applied and cannot be readily flowed into films. If the amylaceous material is of a highly soluble dextrin nature and readily forms a homogeneous suspension in water at ordinary temperatures and pressures, the amount of urea may be much less but is usually preferably at least 5% based upon the amount of dextrin and urea. It will be observed that with dextrins the amount of water required to produce a homogeneous suspension is much less than with starches. Hence, the concentration of urea with respect to water may still be relatively high. The upper limit of the amount of the urea is that amount which may be added to the composition without crystallization out of solution; in other words, the upper limit is dependent upon the solubility of the urea in water.

The amount of water may vary somewhat depending largely upon the nature and proportions of the ingredients. Less water is usually required with dextrins than with starches to produce a fluid consistency by cooking without urea. For instance, a dextrin may take up from about 0.5 part to 2.0 parts of water per part of dextrin; a so-called modified starch may be capable of taking up from 2 to 15 parts of water per part of starch; and an undegenerated starch may take up about 15 to 30 parts of water to each part of starch. Undegenerated starches and many modified starches, however, will not disperse or dissolve in water to any substantial extent, say, more than 5% at ordinary temperatures and pressures. In general, it is preferable to use as little water as possible to obtain the desired fluid and film-forming characteristics and to produce a colloidal dispersion or solution. In making enevelope adhesives, it is generally preferable that the ratio of water to total amylaceous material and urea be within the range of about 1:4 to 1:1. In making adhesives for the seams of paper bags, it is preferable to use from 1 to 3.5 parts of water to 1 part total amylaceous substance and urea. In other cases even more water may be used.

If desired a base material may be prepared by merely mixing together the urea and amylaceous material in the dry state. This mixture when treated with water then forms an adhesive composition. Compositions prepared by merely mixing together the urea and amylaceous material are especially suitable for shipment as such. Instead of merely mixing the ingredients at ordinary temperatures and pressures, the urea and amylaceous substance may be heated together at a temperature above the melting point of urea and the resultant composition allowed to cool and then ground.

The mixing of the urea and amylaceous substance with water may be effected at ordinary temperatures. If desired, however, elevated temperatures may be used, for instance, within the range 140° to 180° F. Higher or lower temperatures may be used but the temperatures should be below the temperature at which substantial decomposition of urea occurs. Atmospheric, subatmospheric or superatmospheric pressures may be employed.

It will be recognized that the time of mixing will vary, depending upon the size of the batch and the efficiency of the apparatus. Usually the mixing is effected until a homogeneous gelatinous product is obtained. For example, this may require mixing for 10 to 15 minutes and then allowing the product to stand overnight.

As illustrated in the examples, the amount of normally solid acid employed as a stabilizing agent may be as low as 0.25 part for 32 parts of urea, or approximately .78%. Normally good results can be obtained employing between 1% and 2% of a normally solid acid such as citric acid, based upon the total quantity of urea. Usually the amount of acid employed merely for a stabilizing action will be less than 5% of the amount of urea.

Other substances which may be added to the mixture of amylaceous material and urea, either before or after mixing with water, are auxiliary gelatinizing agents, wetting and dispersing agents, neutralizing agents, bleaching agents, fillers and pigments. The resultant mixture may contain any one of such substances or any combination thereof. As examples of addition agents which appear to have a gelatinizing action may be mentioned resorcinol, chloral hydrate, sodium salicylate, calcium chloride, zinc chloride, magnesium chloride and potassium acetate. Examples of bleaching agents are sodium bisulfite and sodium hydrosulfite. These are especially desirable where the compositions are slightly dark in color. Fillers may be used to give body to the product. Examples are clay, bentonite and the like.

In applying the compositions of the invention for adhesive purposes, the composition may be spread on the surface of the material to be glued, for example, paper, at ordinary temperatures, and sealed; or heat and pressure may be used, for instance, by sealing together the surfaces with adhesive composition between them and drying by means of a current of air which may be hot or cold. Potentially adhesive surfaces may be formed by coating the surface of the paper or other material (e. g., cloth, wood, metal, fibrous sheet materials, and the like) with the composition and drying the coating. These surfaces are adhesive when moistened.

The compositions of the invention may be used in coating, impregnating, and sizing fibrous sheet materials, including all types of paper, cloth and similar materials. Likewise, they may be used in coating wood, glass and metal in sheet form, e. g., cans. Good results are obtained in gluing varnished labels on cans with these compositions. They may also be used in making tight-wrapped boxes without warping. Compositions of the invention may also be used in oil proofing paper, paper board and similar materials and in treating wallpaper by applying a coating thereto.

The invention has the advantage of providing new and improved compositions which are cheaply and readily available and at the same time possess good adhesive strength. Firm adhesion is obtained with bond paper which is more difficult to seal than most papers. Furthermore, the adhesive compositions of this invention are cold water adhesives. They may be prepared by mixing the ingredients at ordinary temperatures and may be applied at such temperatures.

Adhesive liquids prepared in accordance with this invention may be used on envelope machines as a back seam gum, or for other purposes. One of the requirements of such adhesive liquids is that they remain fluid, that is to say, do not become pasty. The amount of fluidity may vary depending upon the particular type of dextrinized starch conversion product employed as the base material. In general, the body of the adhesive liquid tends to become heavier on standing the lower the solubility of the dextrinized starch conversion product. On the other hand, there is no important increase in the heaviness of the adhesive even on standing 4 or 5 days where the solubility of the dextrine is relatively high, as, for instance, 35% or more. The small amount of citric acid or other normally solid acid employed as a stabilizing agent appears to have no substantial effect on the body of the liquid either in increasing or decreasing its fluidity. The use of an adhesive base derived from a root starch, as, for instance, tapioca, is particularly desirable in the preparation of products that do not tend to set up to a gel as distinguished from the use of an adhesive base derived from corn. In many instances it is desirable to prepare an adhesive liquid for making back seams of envelopes which becomes heavy on standing without actually forming a paste. For this purpose it is often desirable to employ dextrinized starch conversion products having a solubility less than 50%. Thus, many of the compositions in Examples II and III flowed even on prolonged standing. The dextrins used in these compositions will not become pasty when tested as described in U. S. Patent No. 2,210,119. It will be understood that the mild acid may be included either in the dry base or the liquid adhesive and that an acid salt of the acid may be used.

Reference is hereby made to my co-pending application Serial No. 87,015, filed June 24, 1936, now issued as Patent No. 2,215,846 of September 24, 1940, disclosing the use of small quantities of citric acid in amylaceous compositions containing urea, and to my co-pending application Serial No. 112,693, filed November 25, 1936, now issued as Patent No. 2,215,847 of September 24, 1940, which is directed more particularly toward amylaceous compositions of the type described prepared from starch conversion or degeneration products. Reference is also made to my application Serial No. 168,360, filed October 11, 1937, and to my application Serial No. 252,457, filed January 23, 1939, as a continuation-in-part of application Serial No. 168,360, wherein it is stated: "In some instances it may be desirable to add an acid, preferably in amounts just sufficient to neutralize any ammonia which may be formed. For this purpose very small quantities of acid are required, being in the neighborhood of about 2% or less. Acids which are normally solid at ordinary temperatures are preferred, for example, citric acid, tartaric acid, malic acid, boric acid and the like." My application Serial No. 252,457, supra, has now matured into United States Patent No. 2,183,532, and is directed more particularly toward a pre-gummed hanging paper.

Reference may also be made to my application Serial No. 184,929, filed January 14, 1938, as a continuation-in-part of my co-pending application Serial No. 87,015, said application being directed specifically toward amylaceous adhesive compositions containing urea and an alkali metal acetate, and having now matured into United States Patent No. 2,183,736. Reference is also made to my co-pending applications Serial Nos. 268,780, filed April 19, 1939, now issued as U. S. Patent No. 2,215,849 of September 24, 1940, and 271,713, filed May 4, 1939, now issued as Patent No. 2,215,848 of September 24, 1940. The aforesaid applications disclose, but do not claim, the preparation of an adhesive composition containing a normally solid acid, together with urea and an amylaceous substance, all claims toward said compositions having been transferred to the present application.

The present application is a continuation-in-part of the aforesaid co-pending applications.

Having thus described the invention, what I claim as new and desire to secure by Letters Patent of the United States is:

1. An adhesive composition of substantially improved adhesive and film-forming properties, comprising a substantial quantity of an amylaceous substance, a substantial quantity of a water soluble urea, and a minor proportion of a normally solid acid in an amount at least sufficient to stabilize said composition against urea decomposition.

2. An ahesive composition of substantially improved adhesive and film-forming properties, comprising a substantial quantity of an amylaceous substance, a substantial quantity of a water soluble urea, and a minor proportion of a normally solid acid in an amount at least sufficient to stabilize said composition against urea decomposition.

3. An adhesive composition of substantially improved adhesive and film-forming properties, comprising a substantial quantity of an amylaceous substance, a substantial quantity of a water soluble urea, and a minor proportion of a water soluble, normally solid slightly hygroscopic normally crystalline acid in urea crystallization inhibiting quantities.

4. An adhesive composition of substantially improved adhesive and film-forming properties, comprising a substantial quantity of a dextrinized starch conversion product as an adhesive base, a substantial quantity of a water soluble urea, said dextrinized starch conversion product forming the predominant adhesive and film-forming component and said urea forming a minor proportion of said composition in quantities from about 5% and upward, based upon the total weight of said dextrinized starch conversion product and urea, and a small amount of a normally solid acid, the amount of said acid being at least sufficient to stabilize said composition against urea decomposition.

5. An adhesive composition of substantially improved adhesive and film-forming properties, comprising a substantial quantity of a dextrinized starch conversion product as an adhesive base, a substantial quantity of a water soluble urea, said dextrinized starch conversion product forming the predominant adhesive and film-forming component and said urea forming a minor proportion of said composition in quantities from about 5% and upward, based upon the total weight of said dextrinized starch conversion product and urea, and a small amount of citric acid, the amount of said acid being at least sufficient to stabilize said composition against urea decomposition.

6. An adhesive composition of substantially improved adhesive and film-forming properties, comprising a substantial quantity of a dextrinized starch conversion product as an adhesive base, a substantial quantity of a water soluble urea, said dextrinized starch conversion product forming the predominant adhesive and film-forming component and said urea forming a minor proportion of said composition in quantities from about 5% and upward, based upon the total weight of said dextrinized starch conversion product and urea, and a small amount of boric acid, the amount of said acid being at least sufficient to stabilize said composition against urea decomposition.

7. An adhesive composition of substantially improved adhesive and film-forming properties, comprising a substantial quantity of a dextrinized starch conversion product as an adhesive base, a substantial quantity of a water soluble urea, said dextrinized starch conversion product forming the predominant adhesive and film-forming component and said urea forming a minor proportion of said composition in quantities from about 5% and upward, based upon the total weight of said dextrinized starch conversion product and urea, and a small amount of a normally solid lower aliphatic carboxylic acid, the amount of said acid being at least sufficient to stabilize said composition against urea decomposition.

8. A remoistening adhesive composition of substantially improved adhesive and film-forming properties, comprising a substantial quantity of a starch conversion product as an adhesive base, a substantial quantity of a water soluble urea in amounts from about 5% and upward, based on the total weight of said starch conversion product and urea, and a minor proportion of a normally solid acid, the amount of said acid being at least sufficient to stabilize said composition against urea decomposition.

9. A remoistening adhesive composition of substantially improved adhesive and film-forming properties, comprising a substantial quantity of a starch conversion product as an adhesive base, a substantial quantity of a water soluble urea in amounts from about 5% and upward, based on the total weight of said starch conversion product and urea, and a minor proportion of citric acid, the amount of said acid being at least sufficient to stabilize said composition against urea decomposition.

10. A gelatinized starch composition of strong adhesive properties, said composition containing a major proportion of a starch, about 25% to about 50% of urea, and a minor proportion of citric acid, the amount of said acid being at least sufficient to stabilize said composition against urea decomposition.

11. A dry adhesive base composition adapted to form a gelatinous adhesive film-forming dispersion upon the addition of water, said composition containing substantial quantities of an amylaceous substance, a substantial quantity of a water soluble urea, and a small amount of a normal solid acid, the amount of said acid being at least sufficient to stabilize said composition against urea decomposition.

12. A dry adhesive base composition adapted to form a gelatinous adhesive film-forming dispersion upon the addition of water, said composition containing substantial quantities of a dextrinized starch conversion product as an adhesive base, a water soluble urea in an amount greater than about 5% but in a minor proportion as compared with the amount of dextrinized starch conversion product, and a small amount of citric acid, the amount of said acid being at least sufficient to stabilize said composition against urea decomposition.

13. A dry base composition adapted to form a gelatinous film-forming dispersion upon the addition of water, said composition containing substantial quantities of a dextrinized starch conversion product as an adhesive base, a substantial quantity of water soluble urea, and a minor proportion of a normally solid acid, the amount of said acid being at least sufficient to stabilize said compostion against urea decomposition.

14. A method of making a liquid adhesive which consists in mixing an amylaceous substance with urea, a normally solid acid and water, under conditions such that a gelatinous dispersion is formed, the amount of said acid being at least sufficient to stabilize said composition against urea decomposition.

15. A method of making a liquid adhesive which consists in heating an amylaceous substance with urea and a normally solid acid in the presence of water at a temperature within the range of about 140° F. to about 180° F. until a gelatinous dispersion is formed, the amount of said acid being at least sufficient to stabilize said composition against urea decomposition.

16. A method of making a liquid adhesive which consists in heating an amylaceous substance with urea and citric acid in the presence of water at a temperature within the range of about 140° F. to about 180° F. until a gelatinous dispersion is formed, the amount of said acid being at least sufficient to stabilize said composition against urea decomposition.

17. The method of making a liquid adhesive suitable for use in envelope machines which consists in mixing a partially converted dextrine which will not become pasty when tested as described in this specification, with urea from 20% to 50% of the dextrine by weight, and a small amount of an organic carboxylic acidic material, dispersing said ingredients in water and allowing the dispersion to stand, the amount of said acidic material being at least sufficient to stabilize said adhesive against urea decomposition.

HANS F. BAUER.